US007438971B2

(12) United States Patent
Bryant et al.

(10) Patent No.: US 7,438,971 B2
(45) **Date of Patent: *Oct. 21, 2008**

(54) ALUMINUM CONDUCTOR COMPOSITE CORE REINFORCED CABLE AND METHOD OF MANUFACTURE

(75) Inventors: David Bryant, Laguna Beach, CA (US); Clement Hiel, Ranchos Palos Verdes, CA (US); William Clark Ferguson, Vista, CA (US)

(73) Assignee: CTC Cable Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/210,052

(22) Filed: Aug. 23, 2005

(65) Prior Publication Data

US 2006/0051580 A1 Mar. 9, 2006

Related U.S. Application Data

(63) Continuation-in-part of application No. 11/061,902, filed on Feb. 17, 2005, now abandoned, which is a continuation-in-part of application No. 10/971,629, filed on Oct. 22, 2004, now Pat. No. 7,179,522, which is a continuation-in-part of application No. 10/691,447, filed on Oct. 22, 2003, now Pat. No. 7,211,319, and a continuation-in-part of application No. 10/692,304, filed on Oct. 23, 2003, now Pat. No. 7,060,326.

(51) Int. Cl.
*B32B 27/04* (2006.01)
*H02G 3/00* (2006.01)

(52) U.S. Cl. .............. 428/300.7; 428/297.4; 428/299.4; 428/299.1; 428/298.1; 428/300.4

(58) Field of Classification Search ....................... None
See application file for complete search history.

(56) References Cited

U.S. PATENT DOCUMENTS 2,625,498 A * 1/1953 Koch .......................... 156/180

(Continued)

FOREIGN PATENT DOCUMENTS

EP 0189846 8/1986

(Continued)

OTHER PUBLICATIONS

Sucuma P. Elliot, “HECO puts new composite conductors to the test”, Transmission and Distribution World, Jun. 1, 2003.

(Continued)

*Primary Examiner*—Jill Gray
(74) *Attorney, Agent, or Firm*—Marsh Fischmann & Breyfogle LLP

(57) ABSTRACT

This invention relates to an aluminum conductor composite core reinforced cable and method of manufacture. The composite core comprises a plurality of longitudinally extending fibers embedded in a resin matrix. The composite core comprises the following characteristics: tensile strength ranging from about 250 to about 350 Ksi; a tensile modulus of elasticity ranging from about 12 to about 16 Msi; and a coefficient of thermal expansion less than or equal to about $6\times10^{-6}$ cm/cm·° C. The composite core is further manufactured according to a one or more die pultrusion system, the system comprising tooling designed in accordance with the processing speed, selection of composite core fibers and resin and desired physical characteristics of the end composite core.

4 Claims, 4 Drawing Sheets

U.S. PATENT DOCUMENTS

| | | | | |
|---|---|---|---|---|
| 3,331,919 | A | | 7/1967 | Vayson |
| 3,599,679 | A | | 8/1971 | Carter |
| 3,692,924 | A | | 9/1972 | Nye |
| 3,717,720 | A | | 2/1973 | Snellman |
| 3,808,078 | A | | 4/1974 | Snellman |
| 3,973,385 | A | | 8/1976 | Roe |
| 4,059,951 | A | | 11/1977 | Roe |
| 4,127,741 | A | * | 11/1978 | Bauer et al. ................. 174/189 |
| 4,422,718 | A | | 12/1983 | Nakagome |
| 4,441,787 | A | | 4/1984 | Lichtenberger |
| 4,620,401 | A | | 11/1986 | L'Esperance et al. |
| RE32,374 | E | | 3/1987 | Dey |
| 4,690,497 | A | | 9/1987 | Occhini |
| 4,763,981 | A | | 8/1988 | Wilkins |
| 4,793,685 | A | | 12/1988 | Taylor |
| 4,961,990 | A | | 10/1990 | Yamada |
| 4,966,434 | A | | 10/1990 | Yonechi |
| 5,068,142 | A | | 11/1991 | Nose et al. |
| 5,082,397 | A | | 1/1992 | Raviv |
| 5,122,622 | A | | 6/1992 | Reuss |
| 5,198,173 | A | | 3/1993 | Terzian et al. |
| 5,198,621 | A | | 3/1993 | Kojima |
| 5,222,173 | A | | 6/1993 | Bausch |
| RE34,516 | E | | 1/1994 | Houghton |
| 5,296,456 | A | | 3/1994 | Shiga |
| 5,304,619 | A | | 4/1994 | Yokoyama |
| 5,437,899 | A | | 8/1995 | Quigley |
| 5,451,355 | A | | 9/1995 | Boissonnat et al. |
| 5,540,870 | A | | 7/1996 | Quigley |
| 5,561,729 | A | | 10/1996 | Parris |
| 5,626,700 | A | | 5/1997 | Kaiser |
| 5,651,081 | A | | 7/1997 | Blew |
| 5,808,239 | A | | 9/1998 | Olsson |
| 5,847,324 | A | | 12/1998 | Farquhar |
| 5,917,977 | A | | 6/1999 | Barrett |
| 6,007,655 | A | | 12/1999 | Gorthala |
| 6,180,232 | B1 | | 1/2001 | McCullough |
| 6,245,425 | B1 | | 6/2001 | McCullough |
| 6,270,856 | B1 | | 8/2001 | Hendewerk |
| 6,329,056 | B1 | | 12/2001 | Deve et al. |
| 6,343,172 | B1 | | 1/2002 | Schiestle |
| 6,344,270 | B1 | | 2/2002 | McCullough |
| 6,363,192 | B1 | | 3/2002 | Spooner |
| 6,423,808 | B1 | | 7/2002 | Watanabe |
| 6,447,927 | B1 | | 9/2002 | McCullough |
| 6,463,198 | B1 | | 10/2002 | Coleman |
| 6,528,729 | B1 | | 3/2003 | Kamata |
| 6,568,072 | B2 | | 5/2003 | Wilemon |
| 6,861,131 | B2 | | 3/2005 | Evans |
| 7,015,395 | B2 | | 3/2006 | Goldsworthy et al. |
| 7,060,326 | B2 | | 6/2006 | Hiel et al. |
| 7,211,319 | B2 | * | 5/2007 | Hiel et al. ................ 428/300.7 |
| 2002/0056508 | A1 | | 5/2002 | Brandstrom |
| 2002/0088549 | A1 | | 7/2002 | Fanucci |
| 2002/0176979 | A1 | | 11/2002 | Evans |
| 2002/0189845 | A1 | | 12/2002 | Gorrell |
| 2004/0009338 | A1 | | 1/2004 | Jo |
| 2004/0026112 | A1 | | 2/2004 | Goldsworthy |
| 2004/0131834 | A1 | | 7/2004 | Hiel et al. |
| 2004/0131851 | A1 | | 7/2004 | Hiel et al. |
| 2004/0132366 | A1 | | 7/2004 | Hiel et al. |
| 2004/0182597 | A1 | | 9/2004 | Smith et al. |
| 2004/0235592 | A1 | | 11/2004 | McGrath et al. |
| 2005/0048273 | A1 | | 3/2005 | Ryan |
| 2005/0051580 | A1 | | 3/2005 | Ramey |
| 2005/0129942 | A1 | | 6/2005 | Hiel et al. |
| 2005/0186410 | A1 | | 8/2005 | Bryant et al. |
| 2005/0227067 | A1 | | 10/2005 | Hiel et al. |
| 2006/0016616 | A1 | | 1/2006 | Goldsworthy et al |

FOREIGN PATENT DOCUMENTS

| | | | |
|---|---|---|---|
| EP | 0550784 | A1 | 7/1993 |
| EP | 0346499 | B1 | 5/1995 |
| EP | 0814355 | A1 | 12/1997 |
| EP | 1124235 | A2 | 8/2001 |
| EP | 1168374 | A2 | 1/2002 |
| EP | 1168374 | A3 | 1/2003 |
| JP | 11263888 | | 9/1999 |
| RU | 1817167 | | 5/1993 |
| RU | 2210797 | | 8/2003 |
| WO | WO 95/34838 | | 12/1995 |
| WO | WO 02/06549 | | 1/2002 |
| WO | WO 02/06550 | | 1/2002 |
| WO | WO 02/07170 | | 1/2002 |
| WO | WO 03/050825 | | 6/2003 |
| WO | WO 03/091008 | | 11/2003 |
| WO | WO 2005/040017 | | 5/2005 |

OTHER PUBLICATIONS

Office of Industrial Technologies, "Development of a Composite-Reinforced Aluminum Conductor", Dec. 2001.

Oak Ridge National Laboratory, "Power Grid of the Future", ONRL Review, vol. 35, No. 2, 2002, web-print.

Alcoa Conductor Products Company, "T&D Conductors; Overhead; Underground; Building Wire", Jul. 1, 1989, p. 33.

AGY, "Advanced Materials Solutions for Demanding Applications", Pub. No. LIT-2004-341 (Mar. 2004). www.agy.com web-print.

AGY, "Glassfiber Reference Guide", 1999, Pub. No. LIT-99021 (Jul. 1999), www.agy.com web-print.

International Search Report and Written Opinion corresponding to PCT application (PCT/US04/35201).

* cited by examiner

ALUMINUM CONDUCTOR COMPOSITE CORE REINFORCED CABLE AND METHOD OF MANUFACTURE

This patent application is a U.S. Continuation in Part application that claims priority to U.S. Continuation in Part application Ser. No. 11/061,902 filed on Feb. 17, 2005, now abandoned, which claims priority to U.S. Continuation in Part application Ser. No. 10/971,629 filed on Oct. 22, 2004, now U.S. Pat. No. 7,179,522, which claims priority to U.S. Continuation in Part application Ser. No. 10/691,447 filed on Oct. 22, 2003, now U.S Pat. No. 7,211,319 and U.S. Continuation in Part application Ser. No. 10/692,304 filed on 23 Oct. 2003, now U.S. Pat. No. 7,060,326, each of which claims priority to earlier PCT application PCT/US03/12520 filed in the International Receiving Office of the United States Patent and Trademark Office on 23 Apr. 2003 which claims priority from U.S. Provisional Application Ser. No. 60/374,879 filed in the United States Patent and Trademark Office on 23 Apr. 2002, the entire disclosures of which are incorporated by reference herein.

BACKGROUND OF THE INVENTION

In a traditional aluminum conductor steel reinforced cable (ACSR), the aluminum conductor transmits the power and the steel core is designed to carry the transfer load. Conductor cables are constrained by the inherent physical characteristics of the components; these components limit ampacity. Ampacity is a measure of the ability to send power through the cable. Increased current or power on the cable causes a corresponding increase in the conductor's operating temperature. Excessive heat will cause the cable to sag below permissible levels. Typical ACSR cables can be operated at temperatures up to 100° C. on a continuous basis without any significant change in the conductor's physical properties related to sag. Above 100° C., ACSR cables suffer from thermal expansion and a reduction in tensile strength. These physical changes create excessive line sag. Such line sag has been identified as one of the possible causes of the power blackout in the Northeastern United States in 2003. The temperature limits constrain the electrical load rating of a typical 230-kV line, strung with 795 kcmil ACSR "Drake" conductor, to about 400 MVA, corresponding to a current of 1000 A. Therefore, to increase the load carrying capacity of transmission cables, the cable itself must be designed using components having inherent properties that allow for increased ampacity without inducing excessive line sag.

SUMMARY OF THE INVENTION

The present invention relates to an aluminum conductor composite core (ACCC) reinforced cable and method of manufacture. More particularly, the present invention relates to a cable for providing electrical power having a composite core formed from a plurality of fibers embedded in a resin matrix. The components of the composite core are selected to meet predetermined physical characteristics that enable the core to carry increased ampacity at elevated temperatures without corresponding sag.

One embodiment of a composite core for an electrical transmission cable is disclosed, comprising a plurality of substantially continuous and longitudinally extending fibers of a single fiber type embedded in a resin matrix. The fibers of the composite core are selected to meet certain inherent physical properties. Such values include, an impregnated tensile strength ranging from about 450 Ksi to about 650 Ksi; a tensile modulus of about 12 to about 16 Msi and a coefficient of thermal expansion of about $1.6\times10^{-6}$ cm/cm·° C. to about 0 cm/cm·° C. Fibers comprising these values enable fabrication of an end composite core comprising a tensile strength in the range of about 250 to 350 Ksi, a modulus of elasticity of about 12 to about 16 Msi and a coefficient of thermal expansion less than or equal to about $6\times10^{-6}$ cm/cm·° C. and more preferably a coefficient of thermal expansion less than or equal to about $3.6\times10^{-6}$ cm/cm·° C. In this embodiment, the resin matrix comprises a catalyst activation temperature of about 200 to about 220° F. and a curing temperature ranging from about 240 to about 400° F.

In another embodiment, a method of processing a composite core for an electrical transmission cable is disclosed wherein the composite core comprises a plurality of longitudinally extending fibers embedded in a resin forming a fiber/resin matrix. In one embodiment, the fiber/resin matrix is processed through a first die at about 220° F., a gap at about ambient temperature, and cured in a second die comprising a ramped temperature from about 240° F. to about 400° F.

In a further embodiment, a composite core for an electrical transmission cable is disclosed comprising a plurality of longitudinally extending S-2 glass fibers embedded in a resin matrix forming a fiber/resin matrix, the fiber/resin matrix forming a concentric core.

In yet another embodiment, a method for processing a composite core for an electrical transmission cable is disclosed. The method comprises pulling a plurality of fibers through a resin wet-out system, removing excess resin, pulling the fibers through a first die comprising a temperature ranging from about 200 to about 240° F., pulling the fibers through a gap at about ambient temperature, and pulling the fibers through a second die, the second die having a first and second end, wherein the temperature within the second die ramps from about 220° F. at the first end to about 400° F. towards the second end.

In another embodiment, a composite core for an electrical cable comprising a plurality of fibers embedded in a resin matrix is disclosed wherein the core is processed according to the method of pulling a plurality of fibers through a resin wet-out system, removing excess resin, pulling the fibers through a first die comprising a temperature ranging from about 200 to about 240° F., pulling the fibers through a gap at about ambient temperature, and pulling the fibers through a second die, the second die having a first and second end, wherein the temperature within the second die ramps from about 220° F. at the first end to about 400° F. towards the second end.

In another embodiment, a method for processing a composite core for an electrical transmission cable is disclosed. In this embodiment, pre-processed or raw glass fibers are wet out with a mixed resin and pulled into a circular pattern. The center section of the circular pattern is pulled through a small pre-heater while additional resin-impregnated fibers are pulled around this pre-heated center section and all of the filaments subsequently pulled into a conventional die. This die functions to cure and compact the composite core member. As the cured material exits the die, heat is maintained on the part as it then travels through a heated tube.

DETAILED DESCRIPTION OF THE INVENTION

Figure 1:
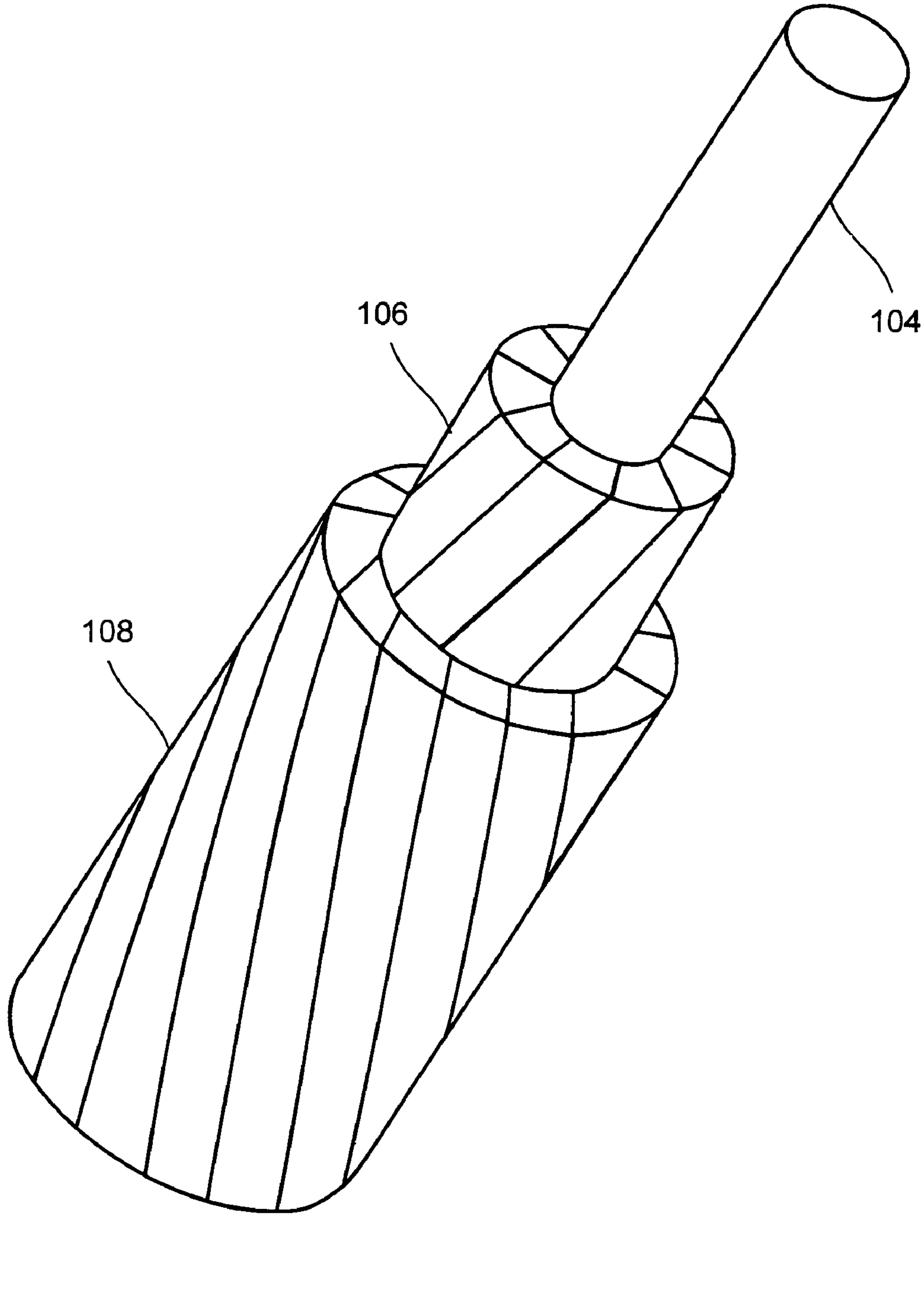
FIG. 1 illustrates one embodiment of an electrical transmission cable comprising a composite core comprised of a plurality of fibers embedded in a resin matrix surrounded by a first and second layer of aluminum conductor.

To increase the load carrying capacity of transmission cables, the cable itself must be designed using components having inherent properties that allow for increased ampacity without inducing excessive line sag. Some of these inherent properties consist of high strength, impact resistance, stiffness, temperature resistance, corrosion resistance and fatigue resistance. Although some components may have high strength and high stiffness, these components may limit other desirable characteristics of the core, for example, flexibility. The composite core must be sufficiently flexible to wrap around a winding wheel for transport. Another difficulty with high strength/high stiffness fibers is that many fiber types are expensive. Thus, to achieve the desired strength, stiffness, flexibility and economic feasibility, one solution has been to combine these fibers with another fiber type to achieve a more balanced set of fiber properties to form a hybridized composite core.

However, a hybridized composite core comprising two or more fibers also suffers from drawbacks resulting from inherent physical properties of the core fibers themselves. For example, differences in the coefficient of thermal expansion for each fiber type results in a mismatch between fibers that may lead to residual stresses within the core. For example, in a carbon/glass core, the fibers are mismatched because glass is in tension while carbon is in compression. It has been shown that degradation begins immediately and continues to propagate limiting the life span of the composite core in some cases by up to 75% of the achievable lifespan.

One solution is to design a composite core comprised of a single fiber type. There are many problems associated with the design of a single fiber type composite core. Single fiber type composite cores have been manufactured using a high strength member such as carbon, embedded in a resin matrix. However, as noted above, a core of this type does not achieve the required flexibility for transportation. As a result, the core must be manufactured in pie shaped segments and fit together to form a core. Further, under certain conditions carbon can react with aluminum and cause corrosion of the cable. In a further alternative, composite cores manufactured with a low modulus fiber such as conventional glass fiber (e.g., E-glass) contain boron. If there is any moisture present in the core boron functions as a catalyst to react with the moisture and create acid. Subsequently, the acid degrades the fibers and leads to failure of the core. In addition, although conventional glass fibers can achieve the desired flexibility of the core, conventional glass fibers do not meet the necessary strength requirements. The result is excessive sagging at high temperatures.

Accordingly, a need exists for an electrical transmission cable comprising a reinforced composite core load bearing element wrapped by a conductor material that is capable of consistently operating at temperatures in excess of 100° C. without inducing excessive sag in the line. Such composite core components should further comprise a material that approaches the strength of a carbon fiber and is both readily available and economically feasible.

Referring to FIG. 1, there is depicted one embodiment of a composite cable 100 for carrying electricity in a power grid. The cable 100 comprises a composite core 104 surrounded by a first layer of aluminum conductor 106 and a second layer of aluminum conductor 108. In this embodiment, the composite core 104 comprises a plurality of a single fiber type embedded in a resin matrix. The components of the core 104, namely, the fibers and the resin, are selected to meet certain physical characteristics in the end composite core 104. Generally, the components are selected to achieve a composite core 104 having a substantially low coefficient of thermal expansion, substantially high tensile strength, the ability to withstand a large range in operating temperature, substantially high dielectric properties, and sufficient flexibility to permit winding on a transportation wheel or a transportation drum. Each of these end characteristics should be achieved in the composite core 104.

In particular, final composite core members according to the present invention comprise: a tensile strength ranging from about 250 to about 350 Ksi, a modulus of elasticity ranging from about 12 to about 16 Msi and more preferably ranging from about 13 to about 15 Msi, an operating temperature capability above −45° C., and more preferably within the range of about 90° C. to about 230° C. and more preferably exceeding 230 C.; and a coefficient of thermal expansion less than or equal to about $6\times10^{-6}$ cm/cm/° C. and more preferably less than or equal to $3.6\times10^{-6}$ cm/cm/° C.

In order to operate in a temperature range between 90° C. to about 230° C., the composite core 104 must fall into each of the required ranges for the physical characteristics outlined, namely, strength, flexibility and a limited thermal expansion. Accordingly, in various embodiments, the components of the core must inherently be able to achieve each of these physical characteristics. A composite core 104 comprised of a single fiber type able to achieve all of these physical characteristics has not previously been conceived.

Difficulties have been encountered with composite cores comprised of more than one fiber type. A composite core comprising conventional E-glass and carbon suffers from inherent difficulties. Glass and carbon have different coefficients of thermal expansion. The coefficient of thermal expansion is a material's fractional change in length for a given unit change in temperature. The composite core is manufactured by pulling the glass and carbon fibers through a resin tank and into a first relatively low temperature die to compress and shape the fibers and remove excess resin. The composite core is then pulled into a second heated die to cure the fiber/resin matrix. Due to the respective coefficient of thermal expansion for each glass and carbon, heat causes glass to expand while carbon's expansion does not closely mirror that of glass. Accordingly, during the cooling process, the contracting glass forces the carbon into a compression state. Consequently, the differences in the coefficients of thermal expansion between glass and carbon results in a mismatch between the fibers thereby creating residual stresses within the core. In some instances, these stresses can lead to premature aging of the core thereby effecting the lifespan of the core. Accordingly, a composite core comprising two fiber types of differing coefficients of thermal expansion has been shown not to be the optimal configuration.

Although residual stresses are likely eliminated by designing a core comprised of a single fiber type, single fiber cores suffer from other inherent difficulties. One example is a composite core comprised of E-glass. In particular, E-glass often contains boron. Boron acts as a catalyst with any moisture within the core to create acid. The acid degrades the fibers and subsequently causes failure of the core and cable. In addition, although a core comprised of E-glass may achieve the desired flexibility to permit winding for transportation, the strength of the fibers is not sufficient to prevent excessive sagging of the core. Accordingly, to achieve a single fiber composite core, the fiber type must be selected having a combination of three variables, namely, high tensile strength, sufficient flexibility, and a low coefficient of thermal expansion to prevent excess sagging of the cable itself. Moreover, the composite core must be able to withstand sagging under extreme conditions such as ice loading.

Although S-2 glass fibers are used as a comparison to conventional E-glass fibers, it is noted that fibers having equivalent or similar physical characteristics as S-2 glass fibers could be used in the invention. The invention is not meant to be specifically limited to S-2 glass fibers however, for purposes of simplicity S-glass fibers are referred to throughout the specification as meaning S-glass fibers and fibers having similar physical properties. Accordingly, comparing for example, conventional E-glass fibers to S-2 glass fibers, S-2 fibers comprise superior inherent physical characteristics including increased strength, comparable flexibility, lighter weight, and a vastly lower coefficient of thermal expansion. Indeed, S-2 fibers comprise 85% more tensile strength in resin impregnated strands than conventional glass fiber and delivers 25% more linear elastic stiffness than conventional E-glass or aramid fibers. Moreover, S-2 fibers comprise a coefficient of thermal expansion about 70% lower than conventional E-glass. Additionally, S-2 fibers weigh less than conventional glass fiber and deliver better cost performance than aramid and carbon fibers.

Additionally, the fiber diameter achievable for S-2 glass exceeds that of conventional glass fibers. The nominal filament diameter comprises about 6 to about 25 μm. Fibers of small filament diameter enable improved bonding between the matrix materials. It is preferable to achieve about a 70% fiber/resin ratio by volume or a range within about 65 to 75%. The small fiber diameter combined with the high speed processing developed specifically to manufacture the composite core, enables tighter compaction with maximum fiber/resin coating and minimal air bubbles creating a core with superior strength properties.

In addition, a composite core comprised of S-2 glass fibers or fibers of equivalent physical characteristics embedded in a resin matrix have been demonstrated to exhibit similar sag behavior to that of a composite core manufactured with E glass and carbon, the carbon providing a low coefficient of thermal expansion. The calculated coefficient of thermal expansion was only slightly lower than a conventional glass/carbon core under extreme loading conditions without the corresponding problems of residual thermal stresses created by mismatched fibers.

In one embodiment of the invention, to create a composite core 104 comprising a plurality of fibers 202 of a single fiber type, the pre-processed fibers 202 are selected to comprise a coefficient of thermal expansion in the range of about $1.6\times10^{-6}$ cm/cm° C. to about $0\times10^{-6}$ cm/cm° C.; an impregnated strand tensile strength in the range of about 450 to about 650 Ksi; and a modulus of elasticity of about 12 to about 16 Msi.

However, selection of a single fiber type having sufficient inherent physical properties still does not enable fabrication of a composite core that achieves the inherent physical characteristics required to carry a heavy load at elevated operating temperatures. Accordingly, in one embodiment, the composite core is comprised of a fiber type, the fiber type comprising the inherent physical characteristics required in the end composite core. In various embodiments, two or more of the following aspects of the composite core are combined to achieve a composite core having the appropriate end characteristics. These aspects include, selection of a fiber type having a defined range of selected inherent physical characteristics, a fiber type having a sufficiently small diameter to enable substantial coating of each fiber within the fiber bundle that comprises the core and further to enable a high fiber/resin fraction, a resin designed to substantially contribute to the fiber type achieving the end physical characteristics of the composite core; or a manufacturing method to enable continuous processing and formation of the composite core, and to further enable substantial coating of each fiber that comprises the composite core while minimizing the introduction of air bubbles and inconsistencies, and to still further enable fast processing of the composite core to form a composite core that is economically feasible.

To achieve a functional core, two or more of these aspects must be combined to achieve a composite core comprising a single fiber type. For example, a composite core comprised of a carbon fiber embedded in a thermoplastic resin has been disclosed. A core of this type cannot consistently operate in the range of about 90° C. to about 230° C. In this embodiment, the core is formed by intermixing thermoplastic resin fibers with carbon fibers and heating the fiber-resin bundle to form the core. Theoretically, the thermoplastic resin should coat or wet each fiber enabling formation of a tightly compressed and compact core. However, it has been shown that the resin coats the fibers unevenly. Wetting and infiltration of the fiber tows in composite materials is of critical importance to performance of the resulting composite. Incomplete wetting results in flaws or dry spots within the fiber composite reducing strength and durability of the composite product.

Still further, a core comprised of carbon and resin is susceptible to failure due to a galvanic reaction between carbon and aluminum. Although carbon is a poor conductor, once current is carried through the cable the carbon begins to heat. This heating leads to failure of the core. Moreover, the reaction between the aluminum and carbon causes the aluminum to corrode. Accordingly, a carbon composite core is not an effective core. Notwithstanding these inherent physical incompatibilities, carbon is difficult if not impossible and expensive to obtain. As such, carbon is not an economically feasible solution.

S-glass or equivalent type fibers are less susceptible to strain corrosion than conventional glass fibers. Strain corrosion occurs when the ions in the glass disperse and cause pitting along the surface of the composite core. Such pitting weakens the core.

Figure 3:
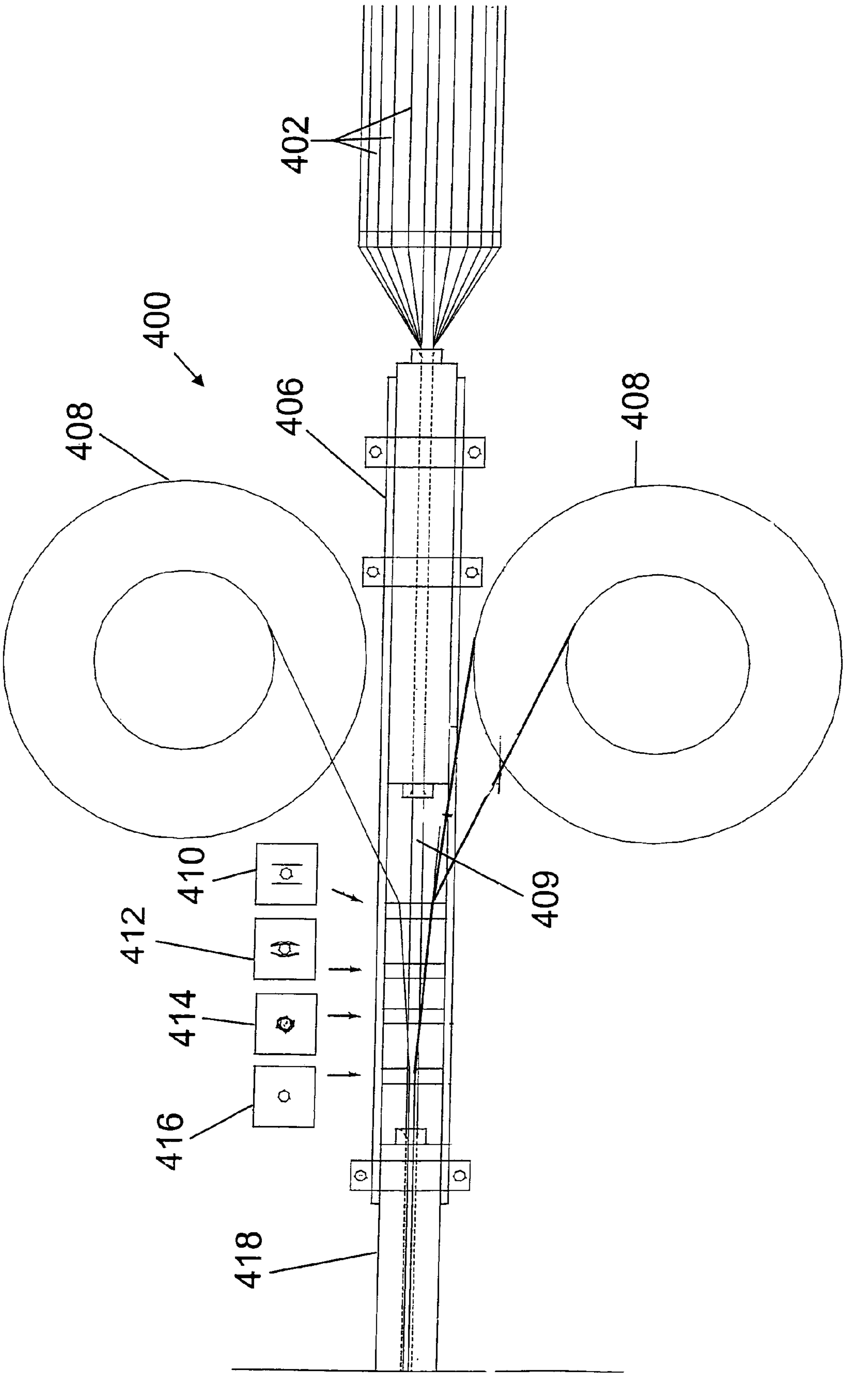
FIG. 3 illustrates an alternate embodiment of method to fabricate a composite core comprising a plurality of fibers embedded in a resin matrix.

To further protect against strain corrosion and other effects caused by moisture penetration of the core, surface coatings may be used to coat the outer surface of the core. Such surface coatings were disclosed in Continuation in Part application Ser. No. 10/971,629 which is incorporated by reference herein. In such embodiments, the core is pulled from a first die and wrapped with a protective tape, coating or film, as depicted in FIG. 3. Although tape, coating and film may be used to describe different embodiments, the term film is used herein to simplify the description and is not meant to be limiting.

FIG. 3 illustrates a system 400 to fabricate a core 409 further comprising an outer coating. In this embodiment, fibers 402 are pulled through a first die 406. Once the core 409 exits the first die 406, a coating or wrapping is applied to the outer surface of the core 409 in the gap between the first die 406 and a second die 418.

In particular, as shown in FIG. 3, two large rolls of tape 408 introduce tape into a first carding plate 410. The carding plate 410 aligns the tape parallel to each other surrounding the core. The core 409 is pulled to a second carding plate 412. The carding plate 412 function is to progressively fold the tape towards the center core 409. The core 409 is pulled through a third carding plate 414. Carding plate 414 functions to fold the tape towards the center core 409. Referring again to FIG. 3, the core 409 is pulled through a fourth carding plate 416 which functions to further wrap the tape around the core 409. Although this exemplary embodiment comprises four carding plates, the invention may encompass any plurality of plates to encompass the wrapping. The area between each die can also be temperature controlled to assist with resin catalyzation and processing. In this embodiment, once the core 409 is wrapped it is pulled into a second die 418.

As described above, selection of appropriate fibers alone, that is, selection of fibers that comprise all of the desired physical characteristics of the end composite core may not result in a composite core capable of achieving the desired physical characteristics and capable of sustaining operation above 90° C. Accordingly, in one embodiment, fibers are selected having particular inherent characteristics and combined with a resin also having predetermined physical characteristics.

In various embodiments, a smaller fiber diameter enables a higher surface to resin volume fraction and increased bonding within the composite core. Preferably, the resin should coat the entire surface of each fiber in the bundle. In addition, the manufacturing process should remove excess resin and not allow the formation of air bubbles within the fiber resin matrix. Accordingly, the manufacturing process plays a role in the ability to achieve a composite core comprised of a single fiber type capable of operating within the required physical characteristics of the end composite core.

The inherent physical characteristics of the resin in the fiber resin matrix contributes to the ability to design a single fiber type composite core comprising the desired physical characteristics of the end composite core. In various embodiments, the resin should comprise a viscosity that enables coating of the fibers at about ambient temperature and further comprises a relatively rapid catalyzation and cure rate to function in a high speed processing environment.

In further embodiments, the manufacturing method contributes to the ability to fabricate a composite core comprising the required physical characteristics. Preferably, the manufacturing method enables substantial coating of each fiber with resin, prevents formation of bubbles or inconsistencies within the fiber/resin matrix and enables high speed processing of the composite core member.

In one embodiment, the processing method comprises a resin tank, a first die to activate the resin and compress and shape the fiber/resin core, and a second die at a higher temperature than the first die to cure the fiber/resin core. It has been determined that speed of processing may be limited by the tackiness and adhesive properties of the resin matrix. That is, at a certain temperature the resin is heated to a "tacky" stage. This stage translates to a certain lengthwise portion of the die where the core may adhere to the inside walls of the die. The lengthwise portion depends on the speed of pultrusion through the system, however, this adherence may remove outer portions of the core and cause weaknesses in the core and corrupt the manufacturing process itself.

Accordingly, a two die system was developed wherein the first die functions to pre-heat the fibers and resin to a stage that allows compression of the core, removal of excess resin and begins catalyzation of the resin. There is a gap between the first and second die to allow the resin to begin catalyzing before entering the second "curing" die. The effect of this two die system is to minimize the time in the "tacky" stage within the second die and consequently, enables much faster processing. The process is described in detail below.

Figure 4:
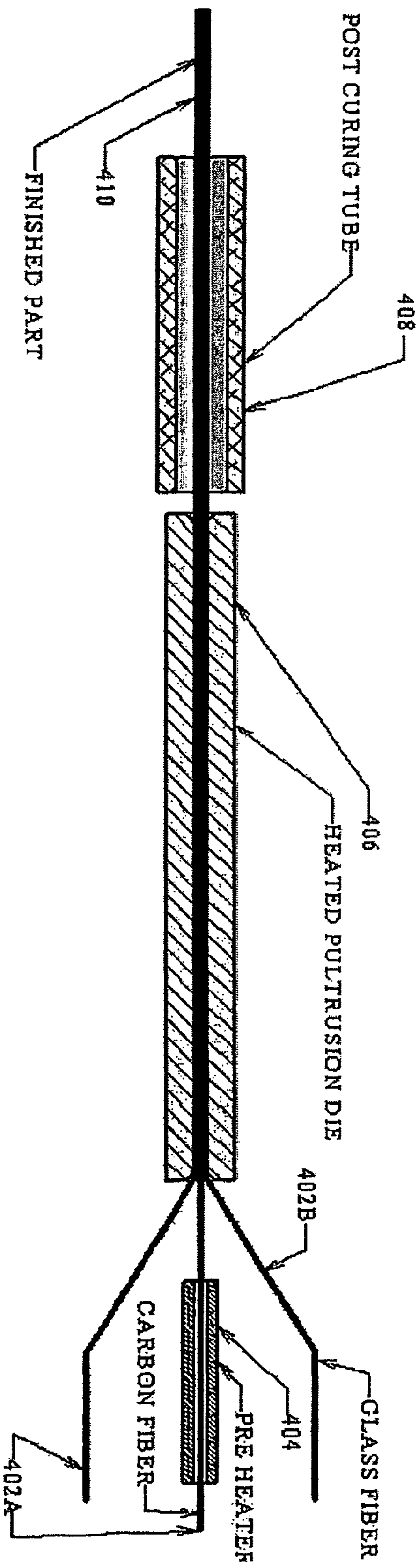
FIG. 4 illustrates an alternate embodiment of a method to fabricate a composite core comprising a plurality of fibers embedded in a resin matrix.

Alternatively, the composite core member may be manufactured using a one die system. Although various one die systems are contemplated by the invention, one example of an embodiment for a one die processing system 400 is illustrated in FIG. 4. In this embodiment, the pre-processed or raw glass fibers 402 are wet out with a mixed resin and pulled into a circular pattern. The center section 402A of the circular pattern is pulled through a small pre-heater 404 to help accelerate the catalyzation process from the inside of the part while additional resin-impregnated fibers 402B are pulled around this pre-heated center section and all of the filaments 402 subsequently pulled into a conventional die 406. This die functions to cure and compact the composite core member. As the cured material exits the die, heat is maintained on the part as it then travels through a heated tube 408. Maintaining elevated temperature helps improve the high-temperature performance characteristics of the finished part by raising its "glass transition temperature (Tg)."

EXAMPLE

A particular example embodiment of the invention is now described wherein the composite strength member comprises S-2 glass. It is to be understood that the example is only one embodiment of the invention and it is not meant to limit the invention to this one embodiment. It is noted that one skilled in the art will recognize other equivalent embodiments. An example of an S-2 glass is S-2 Glass roving by AGY Corporation, the specifications of which are set forth in the brochure, "Advanced Materials-Solutions for Demanding Applications", Pub. No. LIT-2004-341 (03/04), which may be found at www.agy.com, the contents of which are incorporated by reference herein. Compared to Aramid and carbon fiber, S-2 Glass fiber offers enhanced high performance properties at a lower cost. Moreover, the catenary-free, single-end roving construction of ZenTron fiber for example, translates into more efficient processing for composites that are pultruded. A typical fiber roving diameter ranges from about 9-25 μm, and more preferably ranges from about 9-15 μm, and most preferably is about 13 μm.

Compared to conventional glass fiber, S-2 glass fiber provides 85% more strength in resin impregnated strands, better fiber toughness, better impact deformation characteristics, and 25% more stiffness.

In various embodiments, the composite core diameter ranges from about 0.25 inches to about 0.75 inches. The fiber structures in this particular embodiment are for a Drake size core, namely, a core that is 0.375 inches in diameter comprises 57 ends of 250 yield AGY S-2 ZenTron fibers. The resin used may be XU 9779 by Huntsman Corporation. Prior to processing, the resin generally has a viscosity of about 5000 to about 15,000 cps @ 50° C. and an epoxy equivalent weight of about 140 to about 180 grams/equivalent weight. The resin may further comprise at least one mold release element. The mold release element comprises a type of animal fat and is selected for a particular melting point. As the resin is heated, the mold release element rises to the outside of the core and functions as a lubricant to facilitate transmission through the die system. In one embodiment, the resin may comprise two or more mold release elements, wherein the first mold release element comprises a low melting point and the second element comprises a higher melting point to facilitate lubrication of the core in the second high temperature die.

According to the invention, the resin is not limited to the Huntsman resin. For example, a Novolac Epoxy blend resin system may be used. In this embodiment, the resin system may further comprise a hardener system such as an alicyclic dicarboxylic anhydride and a clay-like filler to improve process-ability and physical characteristics of the composite core member.

Figure 2:
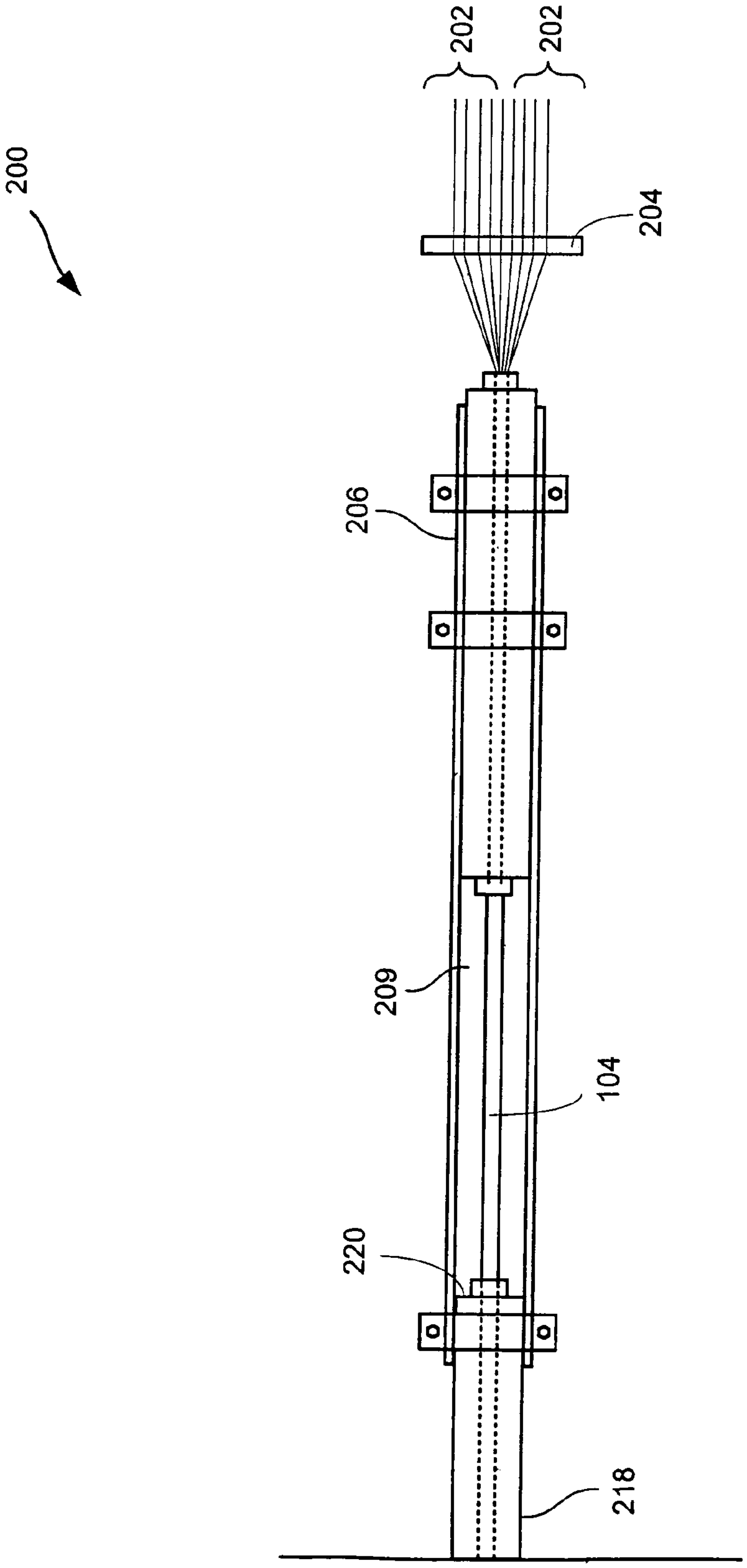
FIG. 2 illustrates one embodiment of a method to fabricate a composite core comprising a plurality of fibers embedded in a resin matrix.

The processing speeds for a two die system for the manufacture of a composite core according to the invention may range from about 30 to about 60 inches/min. More preferably, the processing speeds are in the range of about 48 inches/min. For this example, a processing speed of 48 inches/min is used. Generally, as depicted in FIG. 2, one embodiment of a system 200 for the fabrication of a composite core 104 comprises a wet-out system (not shown), a first die 206, a gap 209 between the first die 206 and a second die 218, and a second die 218 that functions to cure the core 104. In operation, the fibers 202 are pulled through a wet out system comprising approximately ambient temperature and into a first fiber guide 204. The temperature of the wet-out system must be sufficiently low so as not to begin catalyzation of the resin. The wet-out system may further comprise a tank or relatively shallow reservoir of resin wherein the fibers may be pulled through the reservoir for wetting. The fiber guide 204 separates the fiber rovings 202 for optimal wet-out. The fibers 202 are then directed towards the center and into the first die 206.

The first die 206 comprises a minimal length of 10 inches but may extend up to three times this length depending on the process speed. For example, to double the line speed in the process, it may be necessary to double the length of each die. Preferably, the length of the first die 206 is approximately 12 inches.

The temperature of each die is important to the end characteristics of the composite core. In this example, the temperature range of the first die 206 is preferably from about 200° F. to about 240° F. and more preferably about 220° F. The purpose of the first die 206 is to begin the catalyzation process of the resin and retain the fiber/resin matrix in the beginning stages of transformation from liquid to solid. For this system, the resin is specifically designed to change from a liquid to a solid in a short period of time. Where the first die exceeds the appropriate temperature range, the fiber/resin matrix transitions into a tacky stage and begins to harden. Because the core is being pulled through the die at fast speeds, particles from the exterior portion of the core tend to break off and stick to the inside of the die. The process not only weakens and adds stresses to the core, but further effects additional core segments being pulled through the die. Such particles contribute to system crashes.

The system further comprises a gap 209 at about ambient temperature between the first 206 and second dies 218. Preferably, the gap 209 ranges from about 4 inches to about 20 inches depending on the speed of processing. More preferably, the gap 209 is about 6 inches in length for a processing speed of 48 inches/min. During this phase of fabrication, the resin is still catalyzing outside of the dies 206 and 218.

The core 104 is pulled through the gap 209 and into a second or downstream die 218 having a first 220 and second end (not shown) and further having a ramped temperature within the die 218. Preferably, the second die 218 comprises a length ranging from about 30 inches to about 80 inches depending on the processing speeds. More preferably, the die 218 comprises a length of about 36 inches. Further preferably, the temperature ranges from about 230 F to about 400 F within the die. More preferably, the temperature ranges from about 240 F to about 400 F and then drops to about 380 F towards the end of the second die 218. The ramping of the temperature within the die 218 combined with the processing speed and the pre-catalyzation step effectively reduces the time that the core spends within the die 218 in the tacky phase by about 75% thereby translating into an approximate 75% decrease in length of the die 218 that the core 104 may stick to the inner surface. To further combat the tacky stage, a mold release element may be added to the resin system comprising a melting point within the ramped temperature range of the die, namely, between about 240 F and 400 F Preferably, the mold release element comprises a melting point that coincides with the tacky stage of core curing.

The composite core 104 is pulled from the second die 218 and into ambient temperature for a distance sufficient to allow the core to cool before entering the gripper system.

To create a composite core 104 comprising a plurality of fibers 202 of a single fiber type, the pre-processed fibers 202 are selected to comprise a coefficient of thermal expansion in the range of about $1.6\times10^{-6}$ cm/cm° C. to about $0\times10^{-6}$ cm/cm° C.; an impregnated strand tensile strength in the range of about 450 to about 650 Ksi; and a modulus of elasticity of about 12 to about 16 Msi. Moreover, the resin is selected to comprise a catalyzation temperature that begins around about 220° F. However, mere selection of the appropriate fiber/resin matrix does not enable formation of a core comprising the appropriate inherent physical properties. The resin should be further adapted to process at predetermined speeds and activation/cure temperatures. Accordingly, the selected fiber/resin matrix is combined with predetermined characteristics of the tooling, i.e., the die system including temperature ranges and gaps.

In various embodiments of the invention, the tooling may be adapted to accommodate increased processing speeds. In general, the length of the tooling, i.e., the length of the first die, the gap and the second die, is increased linearly with respect to the increased processing speeds. For example, to increase the processing speed to twice as fast as a baseline speed, the tooling lengths (first die, second die and gap between the first and second dies) will have to be increased to about twice the baseline lengths.

Accordingly, in various embodiments, the length of the dies 206 and 218 are designed in conjunction with the fiber/resin matrix and desired processing speeds. According to the resin properties, the dies are designed to be a certain length and temperature. Moreover, the gap between the dies is formulated based on the cure time of the resin system. Accordingly, the fiber/resin matrix is dependent on the processing components and vice versa.

It is to be understood that the invention is not limited to the exact details of the construction, operation, exact materials, or embodiments shown and described, as modifications and equivalents will be apparent to one skilled in the art without departing from the scope of the invention.

We claim:

1. A composite core for an electrical transmission cable, the core comprising:

a plurality of longitudinally extending S-2 glass fibers embedded in resin matrix, to form a composite core member, the high strength glass fibers comprise tensile strength ranging from about 450 to about 650 Ksi, and tensile modulus of elasticity ranging from about 12 to about 16 Msi, and a coefficient of thermal expansion ranging from about $1.6\times10^{-6}$ cm/cm° C. to about $0\times10^{-6}$ cm/cm° C.; and an outer protective coating adjacent to and surrounding the composite core member.

2. The composite core of claim 1, wherein the outer protective coating comprises a protective tape or a film.

3. A composite core for an electrical transmission cable, the core comprising:

a plurality of longitudinally extending S-2 glass fibers embedded in a resin matrix, to form a composite core member, the composite core member comprising a tensile strength ranging from about 250 to about 350 Ksi; a modulus of elasticity ranging from about 12 to about 16 Msi; and a coefficient of thermal expansion less than or equal to 6 $\times 10^{-6}$ cm/cm ° C., the core capable of operating at temperatures that exceed 230° C. and at temperatures as low as about −45° C.; and an outer protective coating adjacent to and surrounding the composite core member.

4. The composite core of claim 3, wherein the outer protective coating comprises a tape, coating or film.

* * * * *